D. CLOW.
HARVESTER RAKE.
No. 107,004. Patented Sept. 6, 1870.
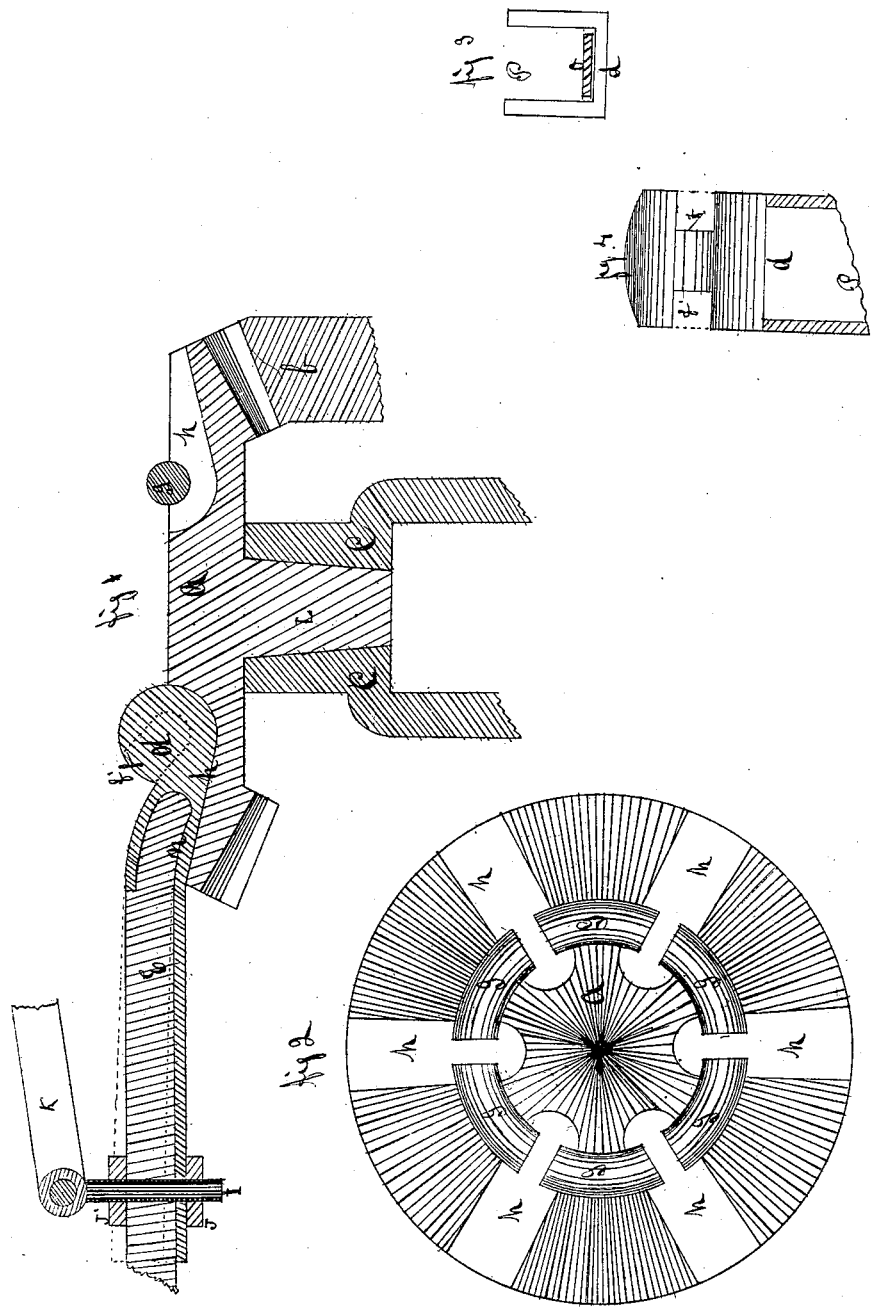

United States Patent Office.

DANIEL CLOW, OF JANESVILLE, WISCONSIN.

Letters Patent No. 107,004, dated September 6, 1870.

IMPROVEMENT IN HARVESTER-RAKES.

The Schedule referred to in these Letters Patent and making part of the same

I, DANIEL CLOW, of the city of Janesville, in the county of Rock and State of Wisconsin, have invented certain Improvements in Automatic Harvesting-Reels and Rakes, of which the following is a specification.

My invention relates to an automatic harvester-rake, and

It consists in the construction and arrangement of the rake-arms and the toothed heads, to which they are attached, whereby the rake-arms are easily attached to and detached from their operating head, and the cost of manufacturing greatly reduced.

Figure 1 is a transverse vertical section, showing at a glance all the novel features of this invention.

Figure 2 is a top view of the large bevel-wheel A.

Figure 3 is an end view of the rake-arm $d$ and wedge O.

Figure 4 is a top view of the other end of the same thing.

C is the standard or supporting-frame of the said machine, constructed in the usual way, and easily attached to any reaper or harvesting-machine, the lower part thereof broken off in the drawing.

A is the large bevel-wheel, pivoted on the top of the said standard C, and lying in a horizontal position.

$b$ is a small bevel-wheel or pinion, attached to a horizontal shaft, as usual, from which the large bevel-wheel receives its motion through a continuous line of common mechanical arrangements, back to the main driving-wheel.

$d$ is an iron arm, hinged to the said large bevel-wheel, and used in connection with the reel or rake-head E, which is made of wood, and of any convenient length.

$ff$ are recesses or grooves in either side of the said arm $d$, as seen in fig. 4.

$h$ is a recess or groove in the top of the large bevel-wheel, into which the said arm $d$ is inserted, and permanently held there by the hinge $g$, projecting inward from either side thereof, and enters into the said groove $ff$ of the said arm $d$.

Fig. 2 clearly illustrates this peculiar device, and shows at a glance the important feature of this invention.

Now, these said grooves $h\,h\,h\,h\,h\,h$ of the rake-arm $d$, and the said hinges $g\,g\,g\,g\,g\,g$ of the bevel-wheel A, are so constructed that the one fits into the other nicely, and may be attached and detached at pleasure, without interfering one with the other, of the said arms, or disturbing any other part of the said machine by the simple process of hooking the one into the other, and vice versa, and it often occurs in the harvest-field, that these said arms must be taken out and put in, as occasion requires.

Now, the said arm $d$ has a deep groove or recess, P, cut into it from the top downward, as seen in fig. 3, open at one end, and closed at the other, as seen in fig. 1.

At the one end a recess or chamber is formed, into which the said reel or rake-head E is inserted, and permanently held there.

At the other end of the said arm $d$ is a screw, I, and nuts $j\,j$, perpendicularly inserted, to hold the arm and the said reel or rake-head together, and to adjust the same to the desired pitch, which is done by loosening the said nuts, raising the rake, and inserting the wedge O at the bottom, as seen in fig. 3.

L is a gudgeon, upon which the large bevel-wheel turns, and is an integral part of the said wheel, being cast together into one single piece of mechanism.

Now, I am well aware that the leading features of the above-described machine are now, and have been for a long time, in common use; that is to say, the combination of the said wheels with the said standard, the arms of the wheel and reel or rake-head, with the said arms, so that, therefore, my invention relates entirely to the peculiar mechanical construction and arrangement of the several parts described.

What I claim as my invention, and desire to secure by Letters Patent, is—

The construction and arrangement of the bevel-wheel A, having recesses $h$, and hinge projections $g$, and the rake-arm $d$, having recesses $ff$ and chamber $n$, as described.

DANIEL CLOW.

Witnesses:
STANLEY B. SMITH,
WILLARD MERRILL.